US012772334B2

(12) United States Patent
Yamamoto et al.

(10) Patent No.: US 12,772,334 B2
(45) Date of Patent: Oct. 20, 2026

(54) APPARATUS, BASE STATION APPARATUS, AND METHOD

(71) Applicants: DENSO CORPORATION, Kariya-city (JP); TOYOTA JIDOSHA KABUSHIKI KAISHA, Toyota-shi (JP)

(72) Inventors: Tomoyuki Yamamoto, Kariya-city (JP); Hideaki Takahashi, Kariya-city (JP)

(73) Assignees: DENSO CORPORATION, Kariya-city (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 316 days.

(21) Appl. No.: 18/431,236

(22) Filed: Feb. 2, 2024

(65) Prior Publication Data

US 2024/0172327 A1 May 23, 2024

Related U.S. Application Data

(63) Continuation of application No. PCT/JP2022/030006, filed on Aug. 4, 2022.

(30) Foreign Application Priority Data

Aug. 5, 2021 (JP) ................................ 2021-128805

(51) Int. Cl.
*H04W 76/30* (2018.01)
*H04W 36/14* (2009.01)

(52) U.S. Cl.
CPC .......... *H04W 76/30* (2018.02); *H04W 36/14* (2013.01)

(58) Field of Classification Search
None
See application file for complete search history.

(56) References Cited

U.S. PATENT DOCUMENTS 10,623,946 B1 * 4/2020 Kumar .................. H04W 76/16
2021/0377978 A1 * 12/2021 Ozturk .................. H04W 80/02
(Continued)

FOREIGN PATENT DOCUMENTS

WO WO-2022/154384 A1 7/2022
WO WO-2022/211470 A1 10/2022
WO WO-2023013738 A1 2/2023

OTHER PUBLICATIONS

China Telecom, "Analysis on UE Switching without Leaving RRC_ CONNECTED State", Document R2-2105196, 3GPP TSG-RAN WG2 Meeting #114e, May 19-27, 2021.
(Continued)

*Primary Examiner* — Nicholas Sloms
(74) *Attorney, Agent, or Firm* — Harness, Dickey & Pierce, P.L.C.

(57) ABSTRACT

An apparatus includes a memory storing a program; and one or more processors configured to execute the program to: process communication with a first network and a second network; receive, from a base station apparatus in the first network, a radio resource control, RRC, message including first information for indicating a starting position of an aperiodic gap and second information for indicating a length of the aperiodic gap in a case where the apparatus is in RRC connected state in the first network; determine the aperiodic gap based on the first information for indicating the starting position of the aperiodic gap and the second information for indicating the length of the aperiodic gap; and perform a switching for the communication with the second network within the aperiodic gap, wherein the first information and the second information are not maintained for the aperiodic gap.

12 Claims, 10 Drawing Sheets

(56) References Cited

U.S. PATENT DOCUMENTS

| | | | | |
|---|---|---|---|---|
| 2022/0072175 | A1* | 3/2022 | Lovlekar | A61L 2/22 |
| 2023/0080113 | A1* | 3/2023 | Hong | H04W 68/02 370/329 |
| 2023/0262446 | A1* | 8/2023 | Kim | H04W 8/20 455/422.1 |
| 2023/0345332 | A1* | 10/2023 | Wang | H04W 36/144 |
| 2023/0396984 | A1* | 12/2023 | Shrivastava | H04W 76/27 |
| 2024/0073765 | A1* | 2/2024 | Shrivastava | H04W 36/0072 |
| 2024/0196195 | A1* | 6/2024 | Shrivastava | H04W 72/21 |

OTHER PUBLICATIONS

Samsung, Summary of AI 8.3.3: UE Notification on Network Switching for Multi-SIM, Document R2-2104319, 3GPP TSG-RAN WG2 Meeting #113bis-e, Apr. 12-20, 2021.

Mediatek Inc., "Discussion on Re-Establishment Procedure", Document R2-1815998, 3GPP TSG-RAN WG2 Meeting #103bis Oct. 8-12, 2018.

Vivo, "Discussion on Switching Notification Procedure", R2-2100475, 3GPP TSG-RAN WG2 Meeting #113-e, Jan. 25-Feb. 5, 2021, pp. 1-5.

U.S. Appl. No. 18/431,252, filed Feb. 2, 2024, Tomoyuki Yamamoto.

Vivo, "[Post112-e][256][Multi-SIM] Network Switching Details (vivo)", Document R2-2100474, 3GPP TSG-RAN WG2 Meeting #113-e, Jan. 25-Feb. 5, 2021.

Nokia, "Report on LTE Legacy, Mobility, DCCA, Multi-SIM and RAN Slicing", Document R2-2101951, 3GPP TSG-RAN WG2 Meeting #113-e, Jan. 25-Feb. 5, 2021.

Nokia, "Report on LTE Legacy, Mobility, DCCA, Multi-SIM and RAN Slicing", Document R2-2104301, 3GPP TSG-RAN WG2 Meeting #113 bis-e, Apr. 12-20, 2021.

Nokia, "Report on LTE Legacy, Mobility, DCCA, Multi-SIM and RAN Slicing", Document R2- 2106471, 3GPP TSG-RAN WG2 Meeting #114-e, May 19-27, 2021.

3GPP TSG-RAN NR, "Radio Resource Control (RRC) Protocol Specification (Release 16)", 3GPP TS 38.331, V16.5.0, Jun. 2021.

Samsung, "Open Issues on Network Switching for Multi-USIM Devices", Document R2-2105437, 3GPP TSG-RAN WG2 Meeting #114-e, May 17-29, 2021.

Vivo, "Handling Leftovers from Email Discussion on Switching Notification", 3GPP TSG-RAN WG2 Meeting #113 bis-e, Apr. 12-20, 2021.

* cited by examiner

1

APPARATUS, BASE STATION APPARATUS, AND METHOD

CROSS-REFERENCE TO RELATED APPLICATIONS

This application is based on Japanese Patent Application No. 2021-128805, filed on Aug. 5, 2021, the content of which is incorporated herein.

BACKGROUND

1. Technical Field

The present disclosure relates to an apparatus, a base station apparatus and a method.

2. Related Art

In 3rd Generation Partnership Project (3GPP) Release 17, a work item has been launched for formulating functions to monitor for incoming information (for example, sound or data) from networks of a plurality of telecommunications operators for devices each mounted with a plurality of subscriber identity module (SIM) cards.

SUMMARY

An apparatus according to an aspect of the present disclosure includes: a memory storing a program; and one or more processors configured to execute the program to: process communication with a first network and a second network; receive, from a base station apparatus in the first network, a radio resource control, RRC, message including first information for indicating a starting position of an aperiodic gap and second information for indicating a length of the aperiodic gap in a case where the apparatus is in RRC connected state in the first network; determine the aperiodic gap based on the first information for indicating the starting position of the aperiodic gap and the second information for indicating the length of the aperiodic gap; and perform a switching for the communication with the second network within the aperiodic gap, wherein the first information for indicating the starting position of the aperiodic gap and the second information for indicating the length of the aperiodic gap are not maintained for the aperiodic gap.

A base station apparatus in a first network according to an aspect of the present disclosure includes: a memory storing a program; and one or more processors configured to execute the program to: process communication with an apparatus; and transmit, to the apparatus, a radio resource control, RRC, message including first information for indicating a starting position of an aperiodic gap and second information for indicating length of the aperiodic gap in a case where the apparatus is in RRC connected state in the first network, wherein the aperiodic gap is determined based on the first information for indicating the starting position of the aperiodic gap and the second information for indicating the length of the aperiodic gap, a switching for communication with a second network is performed within the aperiodic gap, and the first information for indicating the starting position of the aperiodic gap and the second information for indicating the length of the aperiodic gap are not maintained for the aperiodic gap.

A method performed by an apparatus according to an aspect of the present disclosure includes: processing communication with a first network and a second network; receiving, from a base station apparatus in the first network, a radio resource control, RRC, message including first information for indicating a starting position of an aperiodic gap and second information for indicating length of the aperiodic gap in a case where the apparatus is in RRC connected state in the first network; determining the aperiodic gap based on the first information for indicating the starting position of the aperiodic gap and the second information for indicating the length of the aperiodic gap; and performing a switching for the communication with the second network within the aperiodic gap, wherein the first information for indicating the starting position of the aperiodic gap and the second information for indicating the length of the aperiodic gap are not maintained for the aperiodic gap.

DETAILED DESCRIPTION OF THE PREFERRED EMBODIMENTS

Figure 1:
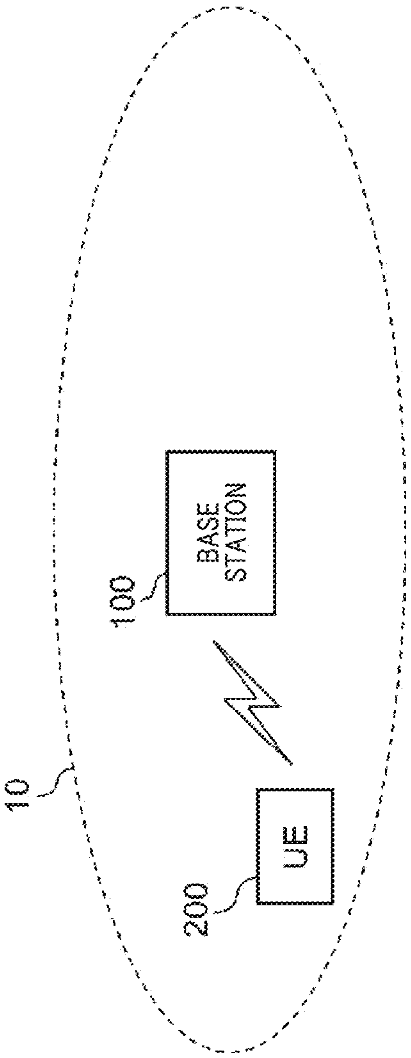
FIG. 1 is an explanatory diagram illustrating an example of a schematic configuration of a system according to embodiments of the present disclosure.

For example, R2-2100474, R2-2101951, R2-2104301, and R2-2106471 each describe the introduction of a switching procedure that uses a time gap for a multi-SIM user equipment (UE) to receive, in a case where the UE is in a connected state in a mobile network, network information in another mobile network. To implement the switching procedure, the use of an existing radio wave quality measurement mechanism has been studied. In particular, R2-2106471 describes that the time gap includes a periodic time gap and an aperiodic time gap and that a parameter of the time gap is provided from the multi-SIM UE to a network by using radio resource control (RRC) signaling.

In addition, 3GPP TS 38.331 V16.5.0 describes that RRC context information (hereinafter, also referred to as configuration information) about the UE is maintained in a state in which the UE is connected to a base station (RRC_CONNECTED), but is not maintained in a state in which the UE is not connected to a base station (RRC_IDLE and RRC_INACTIVE).

A detailed study by the inventors has revealed the following issue. That is, the method described in R2-2106471 uses a measurement mechanism and configuration information about an aperiodic time gap is not released unless otherwise explicitly indicated. Signaling for explicitly indicating the release of the configuration information, however, wastes power or radio resources.

An object of the present disclosure is to provide an apparatus and a method that each make it possible to reduce the consumption of power or radio resources while releasing configuration information about an aperiodic time gap.

An apparatus (200) according to an aspect of the present disclosure includes: a communication processing unit (235) configured to process communication with a first network and communication with a second network different from the first network; and an information obtaining unit (231) configured to obtain configuration information associated with an aperiodic gap that is a gap for switching the apparatus to the second network in a case where the apparatus is in an RRC connected state in the first network. The communication processing unit is configured to switch the apparatus to the second network in the gap indicated by the configuration information in a case where the apparatus is in the radio resource control (RRC) connected state in the first network, and the apparatus does not maintain the configuration information.

An apparatus (100) in a first network according to an aspect of the present disclosure includes: a communication processing unit (145) configured to communicate with a user equipment (200); and an information obtaining unit (141) configured to obtain configuration information associated with an aperiodic gap that is a gap for switching the user equipment to a second network different from the first network in a case where the user equipment is in an RRC connected state in the first network. The communication processing unit is configured to receive an RRC message including the configuration information from the user equipment or transmit an RRC message including the configuration information to the user equipment, and the apparatus does not maintain the configuration information.

A method performed by an apparatus (200) according to an aspect of the present disclosure includes: processing communication with a first network and communication with a second network different from the first network; and obtaining configuration information associated with an aperiodic gap that is a gap for switching the apparatus to the second network in a case where the apparatus is in an RRC connected state in the first network. The apparatus is switched to the second network in the gap indicated by the configuration information in a case where the apparatus is in the radio resource control (RRC) connected state in the first network, and the apparatus does not maintain the configuration information.

A method performed by an apparatus (100) in a first network according to an aspect of the present disclosure includes: communicating with a user equipment (200); and obtaining configuration information associated with an aperiodic gap that is a gap for switching the user equipment to a second network different from the first network in a case where the user equipment is in an RRC connected state in the first network. An RRC message including the configuration information is received from the user equipment or an RRC message including the configuration information is transmitted to the user equipment, and the apparatus does not maintain the configuration information.

According to the present disclosure, it is possible to reduce the consumption of power or radio resources while releasing configuration information about an aperiodic time gap. Note that, instead of or in addition to this advantageous effect, the present disclosure may yield another advantageous effect.

Hereinafter, embodiments of the present disclosure will be described in detail with reference to the appended drawings. In the present specification and the drawings, elements to which similar descriptions are applicable are denoted with the same reference signs, thereby omitting duplicate descriptions.

Descriptions will be given in the following order:

1. Configuration of System
2. Configuration of Base Station
3. Configuration of User Equipment
4. Operation Examples
5. Modification Examples

1. CONFIGURATION OF SYSTEM

An example of a configuration of a system 1 according to embodiments of the present disclosure will be described with reference to FIG. 1. Referring to FIG. 1, the system 1 includes a base station 100 and a user equipment (UE) 200.

For example, the system 1 is a system compliant with technical specifications (TSs) in 3GPP. More specifically, for example, the system 1 is a system compliant with the TSs of 5G or new radio (NR). Naturally, the system 1 is not limited to this example.

(1) Base Station 100

The base station 100 is a node in a radio access network (RAN) and communicates with a UE (for example, UE 200) located within a coverage area 10 of the base station 100.

For example, the base station 100 communicates with a UE (for example, UE 200) by using a RAN protocol stack. For example, the protocol stack includes protocols of RRC, service data adaptation protocol (SDAP), packet data convergence protocol (PDCP), radio link control (RLC), medium access control (MAC), and physical (PHY) layers. Alternatively, the protocol stack does not have to include all of these protocols, but may include some of these protocols.

For example, the base station 100 is a gNB. The gNB is a node that provides NR user plane and control plane protocol terminations towards a UE and is connected to a 5G core network (5GC) via an NG interface. Alternatively, the base station 100 may be an en-gNB. The en-gNB is a node that provides NR user plane and control plane protocol terminations toward a UE and operates as a secondary node in E-UTRA-NR dual connectivity (EN-DC).

The base station 100 may include a plurality of nodes. The plurality of nodes may include a first node that hosts higher layers included in the protocol stack and a second node that hosts lower layers included in the protocol stack. The higher layers may include the RRC layer, the SDAP layer, and the PDCP layer, while the lower layers may include the RLC layer, the MAC layer, and the PHY layer. The first node may be a central unit (CU) and the second node may be a distributed unit (DU). Note that the plurality of nodes may include a third node that performs lower level processing of the PHY layer and the second node may perform higher level processing of the PHY layer. The third node may be a radio unit (RU).

Alternatively, the base station 100 may be one of the plurality of nodes and may be connected to another unit of the plurality of nodes.

The base station 100 may be an integrated access and backhaul (IAB) donor or an IAB node.

(2) UE 200

The UE 200 communicates with a base station. For example, the UE 200 communicates with the base station 100 in a case where the UE 200 is located within the coverage area 10 of the base station 100.

For example, the UE 200 communicates with a base station (for example, base station 100) by using the protocol stack.

In particular, the UE 200 is mountable with two or more SIM cards. That is, the UE 200 is a multi-SIM UE or a multi-SIM device. The UE 200 is capable of performing communication in two or more mobile networks that correspond to the two or more respective SIM cards.

For example, the UE 200 is capable of performing communication in a mobile network (hereinafter, referred to as "first mobile network") that corresponds to one of the two or more SIM cards and includes the base station 100. Further, the UE 200 is capable of performing communication in another mobile network (hereinafter, referred to as "second mobile network") that corresponds to the other one of the two or more SIM cards. The first mobile network is different from the second mobile network.

Figure 2:
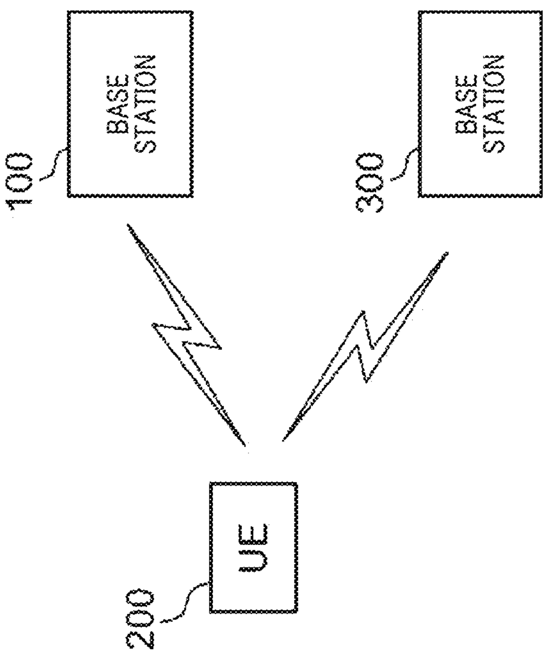
FIG. 2 is an explanatory diagram for explaining an example of a case where a user equipment according to embodiments of the present disclosure is mounted with two SIM cards.

Referring to the example of FIG. 2, for example, the UE 200 is capable of performing communication in the first mobile network including the base station 100 and the second mobile network including a base station 300. For example, the UE 200 may be in an RRC connected state (RRC_CONNECTED) in the first mobile network and be in an RRC idle state (RRC_IDLE) or an RRC inactive state (RRC_INACTIVE) in the second mobile network. In such a case, while the UE 200 is connected to the base station 100 in the first mobile network, communication may occur between the UE 200 and the base station 300 in the second mobile network. For example, network information to be received by the UE 200 may be transmitted by the base station 300.

2. CONFIGURATION OF BASE STATION

Figure 3:
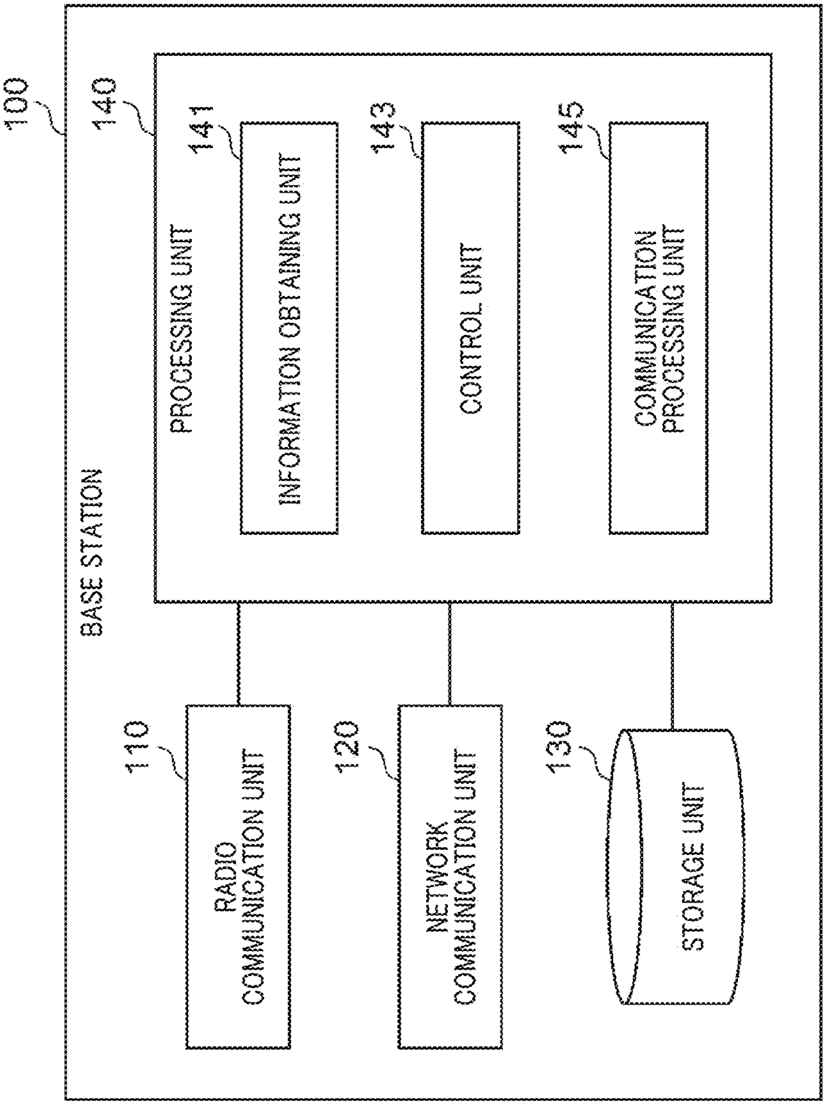
FIG. 3 is a block diagram illustrating an example of a schematic functional configuration of a base station according to embodiments of the present disclosure.
Figure 4:
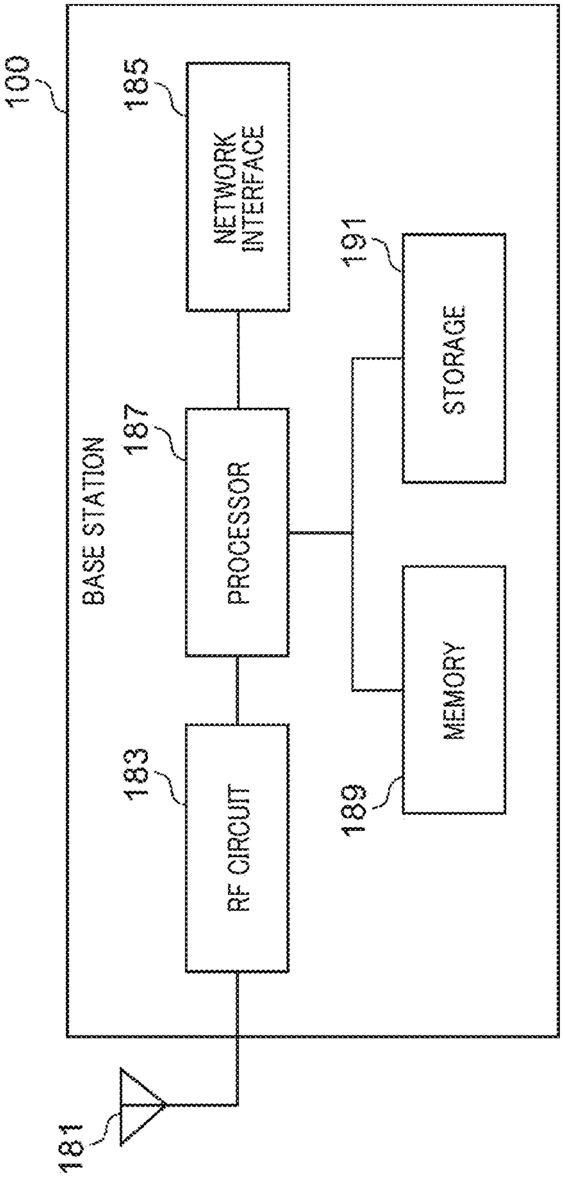
FIG. 4 is a block diagram illustrating an example of a schematic hardware configuration of the base station according to embodiments of the present disclosure.

An example of a configuration of the base station 100 according to embodiments of the present disclosure will be described with reference to FIGS. 3 and 4. Note that a configuration of the base station 300 may also be the same as the configuration of the base station 100.

(1) Functional Configuration

First, an example of a functional configuration of the base station 100 according to embodiments of the present disclosure will be described with reference to FIG. 3. Referring to FIG. 3, the base station 100 includes a radio communication unit 110, a network communication unit 120, a storage unit 130, and a processing unit 140.

The radio communication unit 110 wirelessly transmits and receives signals. For example, the radio communication unit 110 receives a signal from a UE and transmits a signal to the UE.

The network communication unit 120 receives a signal from a network and transmits a signal to the network.

The storage unit 130 stores various kinds of information for the base station 100.

The processing unit 140 provides various functions of the base station 100. The processing unit 140 includes an information obtaining unit 141, a control unit 143, and a communication processing unit 145. Note that the processing unit 140 may further include another component in addition to these components. That is, the processing unit 140 may also perform an operation other than operations of these components. Specific operations of the information obtaining unit 141, the control unit 143, and the communication processing unit 145 will be described in detail later.

For example, the processing unit 140 (communication processing unit 145) communicates with a UE (for example, UE 200) via the radio communication unit 110. For example, the processing unit 140 communicates with another node (for example, a network node in the core network or another base station) via the network communication unit 120.

(2) Hardware Configuration

Next, an example of a hardware configuration of the base station 100 according to embodiments of the present disclosure will be described with reference to FIG. 4. Referring to FIG. 4, the base station 100 includes an antenna 181, a radio frequency (RF) circuit 183, a network interface 185, a processor 187, a memory 189, and a storage 191.

The antenna 181 converts signals into radio waves and emits the radio waves into the air. In addition, the antenna 181 receives radio waves from the air and converts the radio waves into signals. The antenna 181 may include a transmitting antenna and a receiving antenna or may be a single antenna for transmission and reception. The antenna 181 may be a directional antenna and may include a plurality of antenna elements.

The RF circuit 183 performs analog processing on signals that are transmitted and received via the antenna 181. The RF circuit 183 may include a high-frequency filter, an amplifier, a modulator, a lowpass filter, and the like.

The network interface 185 is, for example, a network adaptor, and transmits a signal to a network and receives a signal from the network.

The processor 187 performs digital processing on signals that are transmitted and received via the antenna 181 and the RF circuit 183. The digital processing includes processing of the RAN protocol stack. The processor 187 also performs processing on signals that are transmitted and received via the network interface 185. The processor 187 may include a plurality of processors or may be a single processor. The plurality of processors may include a baseband processor that performs the digital processing and one or more processors that perform other processing.

The memory 189 stores a program to be executed by the processor 187, a parameter associated with the program, and other various kinds of information. The memory 189 may include at least one of a read only memory (ROM), an erasable programmable read only memory (EPROM), an electrically erasable programmable read only memory (EEPROM), a random access memory (RAM), and a flash memory. The whole or part of the memory 189 may be included in the processor 187.

The storage 191 stores various kinds of information. The storage 191 may include at least one of a solid state drive (SSD) and a hard disc drive (HDD).

The radio communication unit 110 may be implemented by the antenna 181 and the RF circuit 183. The network communication unit 120 may be implemented by the network interface 185. The storage unit 130 may be implemented by the storage 191. The processing unit 140 may be implemented by the processor 187 and the memory 189.

Part or the whole of the processing unit 140 may be virtualized. In other words, the part or the whole of the processing unit 140 may be implemented as a virtual machine. In this case, the part or the whole of the processing unit 140 may operate as a virtual machine on a physical machine (that is, hardware) including a processor, a memory, and the like and a hypervisor.

Given the hardware configuration described above, the base station 100 may include a memory (that is, memory 189) that stores a program and one or more processors (that is, processor 187) capable of executing the program and the one or more processors may perform operations of the processing unit 140 by executing the program. The program may be a program for causing the processors to execute the operations of the processing unit 140.

3. CONFIGURATION OF USER EQUIPMENT

Figure 5:
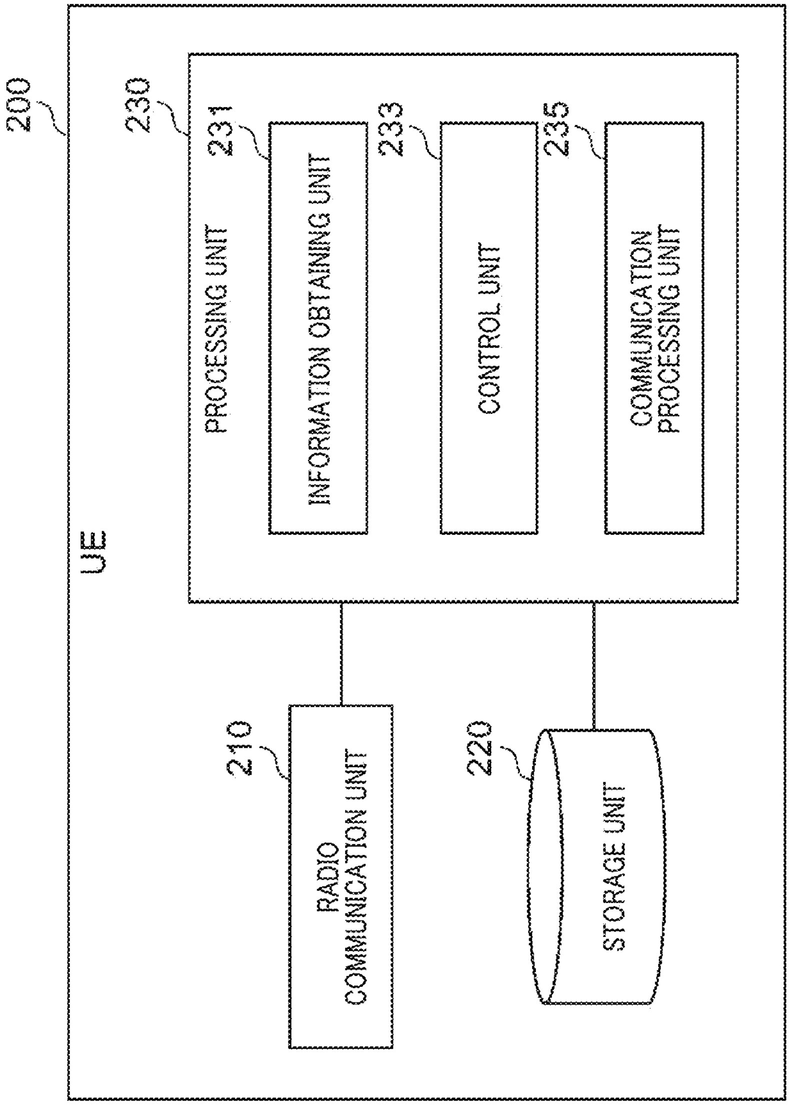
FIG. 5 is a block diagram illustrating an example of a schematic functional configuration of the user equipment according to embodiments of the present disclosure.
Figure 6:
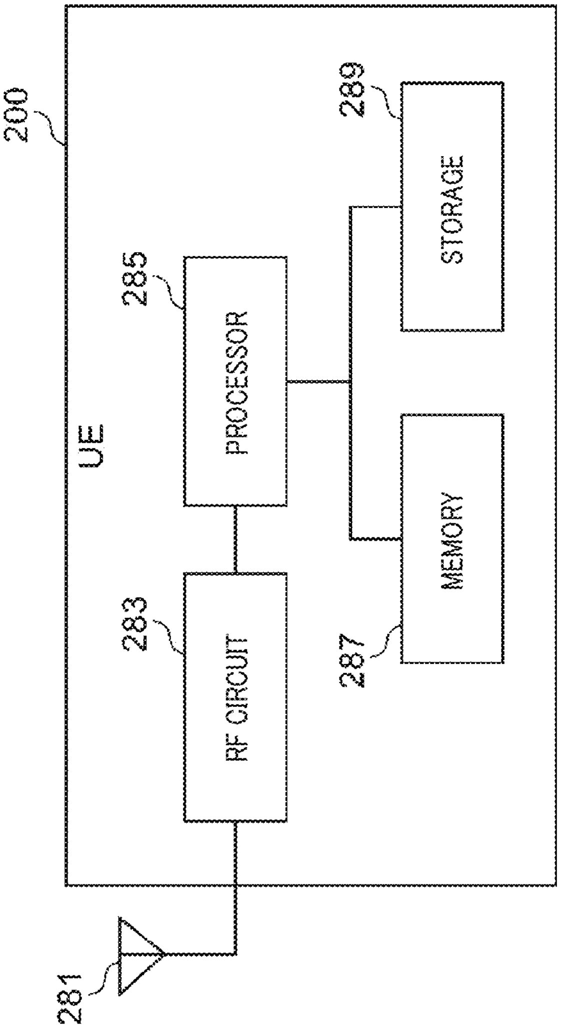
FIG. 6 is a block diagram illustrating an example of a schematic hardware configuration of the user equipment according to embodiments of the present disclosure.

An example of a configuration of the UE 200 according to embodiments of the present disclosure will be described with reference to FIGS. 5 and 6.

(1) Functional Configuration

First, an example of a functional configuration of the UE 200 according to embodiments of the present disclosure will be described with reference to FIG. 5. Referring to FIG. 5, the UE 200 includes a radio communication unit 210, a storage unit 220, and a processing unit 230.

The radio communication unit 210 wirelessly transmits and receives signals. For example, the radio communication unit 210 receives a signal from a base station and transmits a signal to the base station. For example, the radio communication unit 210 receives a signal from another UE and transmits a signal to the other UE.

The storage unit 220 stores various kinds of information for the UE 200.

The processing unit 230 provides various functions of the UE 200. The processing unit 230 includes an information obtaining unit 231, a control unit 233, and a communication processing unit 235. Note that the processing unit 230 may further include another component in addition to these components. That is, the processing unit 230 may also perform an operation other than operations of these components. Specific operations of the information obtaining unit 231, the control unit 233, and the communication processing unit 235 will be described in detail later.

For example, the processing unit 230 (communication processing unit 235) communicates with a base station (for example, the base station 100 or the base station 300) or another UE via the radio communication unit 210.

(2) Hardware Configuration

Next, an example of a hardware configuration of the UE 200 according to embodiments of the present disclosure will be described with reference to FIG. 6. Referring to FIG. 6, the UE 200 includes an antenna 281, an RF circuit 283, a processor 285, a memory 287, and a storage 289.

The antenna 281 converts signals into radio waves and emits the radio waves into the air. In addition, the antenna 281 receives radio waves from the air and converts the radio waves into signals. The antenna 281 may include a transmitting antenna and a receiving antenna or may be a single antenna for transmission and reception. The antenna 281 may be a directional antenna and may include a plurality of antenna elements.

The RF circuit 283 performs analog processing on signals that are transmitted and received via the antenna 281. The RF circuit 283 may include a high-frequency filter, an amplifier, a modulator, a lowpass filter, and the like.

The processor 285 performs digital processing on signals that are transmitted and received via the antenna 281 and the RF circuit 283. The digital processing includes processing of the RAN protocol stack. The processor 285 may include a plurality of processors or may be a single processor. The plurality of processors may include a baseband processor that performs the digital processing and one or more processors that perform other processing.

The memory 287 stores a program to be executed by the processor 285, a parameter associated with the program, and other various kinds of information. The memory 287 may include at least one of a ROM, an EPROM, an EEPROM, a RAM, and a flash memory. The whole or part of the memory 287 may be included in the processor 285.

The storage 289 stores various kinds of information. The storage 289 may include at least one of an SSD and an HDD.

The radio communication unit 210 may be implemented by the antenna 281 and the RF circuit 283. The storage unit 220 may be implemented by the storage 289. The processing unit 230 may be implemented by the processor 285 and the memory 287.

The processing unit 230 may be implemented by a system on a chip (SoC) including the processor 285 and the memory 287. The SoC may include the RF circuit 283 and the radio communication unit 210 may also be implemented by the SoC.

Given the hardware configuration described above, the UE 200 may include a memory (that is, memory 287) that stores a program and one or more processors (that is, processor 285) capable of executing the program and the one or more processors may perform operations of the processing unit 230 by executing the program. The program may be a program for causing the processors to execute the operations of the processing unit 230.

4. OPERATION EXAMPLES

Examples of operations of the base station 100 and the UE 200 according to embodiments of the present disclosure will be described with reference to FIGS. 7 and 8.

(1) Operation of Base Station 100

The base station 100 is connected to the UE 200 in the first mobile network and transmits configuration information about an aperiodic time gap for communication in the second mobile network to the UE 200. When the setting period of an aperiodic time gap expires, the base station 100 releases the configuration information about the aperiodic time gap. The following describes an operation of the base station 100 and relevant information in detail.

(1-1) Configuration of Aperiodic Time Gap

The base station 100 (control unit 143) obtains configuration information about an aperiodic time gap for communication in the second mobile network. The aperiodic time gap is a time gap in which the UE 200 and the base station 100 are in the RRC connected state. For example, the communication in the second mobile network may be the transmission of the network information in the second mobile network and the aperiodic time gap may be an aperiodic time gap for the network information. Note that the communication in the second mobile network may be other aperiodic communication. For example, the communication in the second mobile network may be aperiodic measurement.

The aperiodic time gap may be set for the UE 200 to receive the network information in the second mobile network. In other words, the aperiodic time gap is a time gap for the UE 200 to switch from the first mobile network to the second mobile network. The UE 200 whose RRC state in the first mobile network is RRC_CONNECTED receives the network information in the second mobile network by switching to the second mobile network in a set time gap.

The configuration information about the aperiodic time gap includes period information associated with the setting period of the aperiodic time gap and the aperiodic time gap is set within the setting period. The aperiodic time gap and the setting period will be described in detail with reference to FIG. 7.

Figure 7:
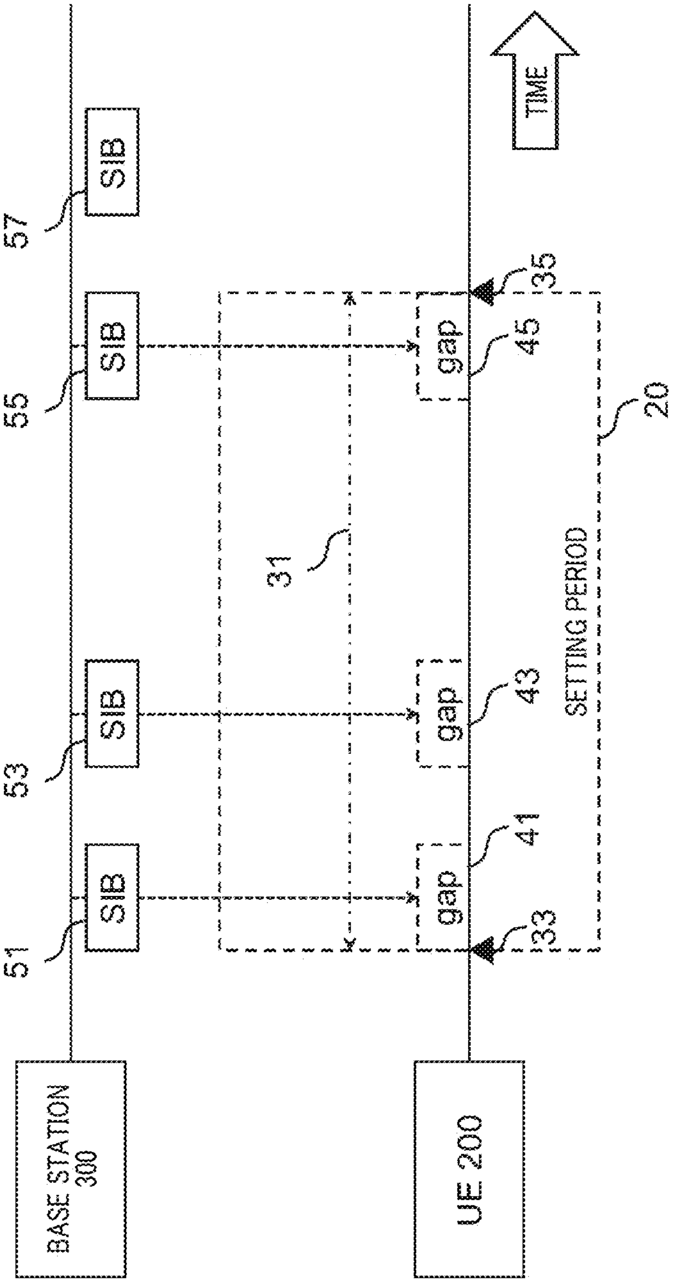
FIG. 7 is a diagram for explaining an example of a setting period of an aperiodic time gap according to embodiments of the present disclosure.
Figure 8:
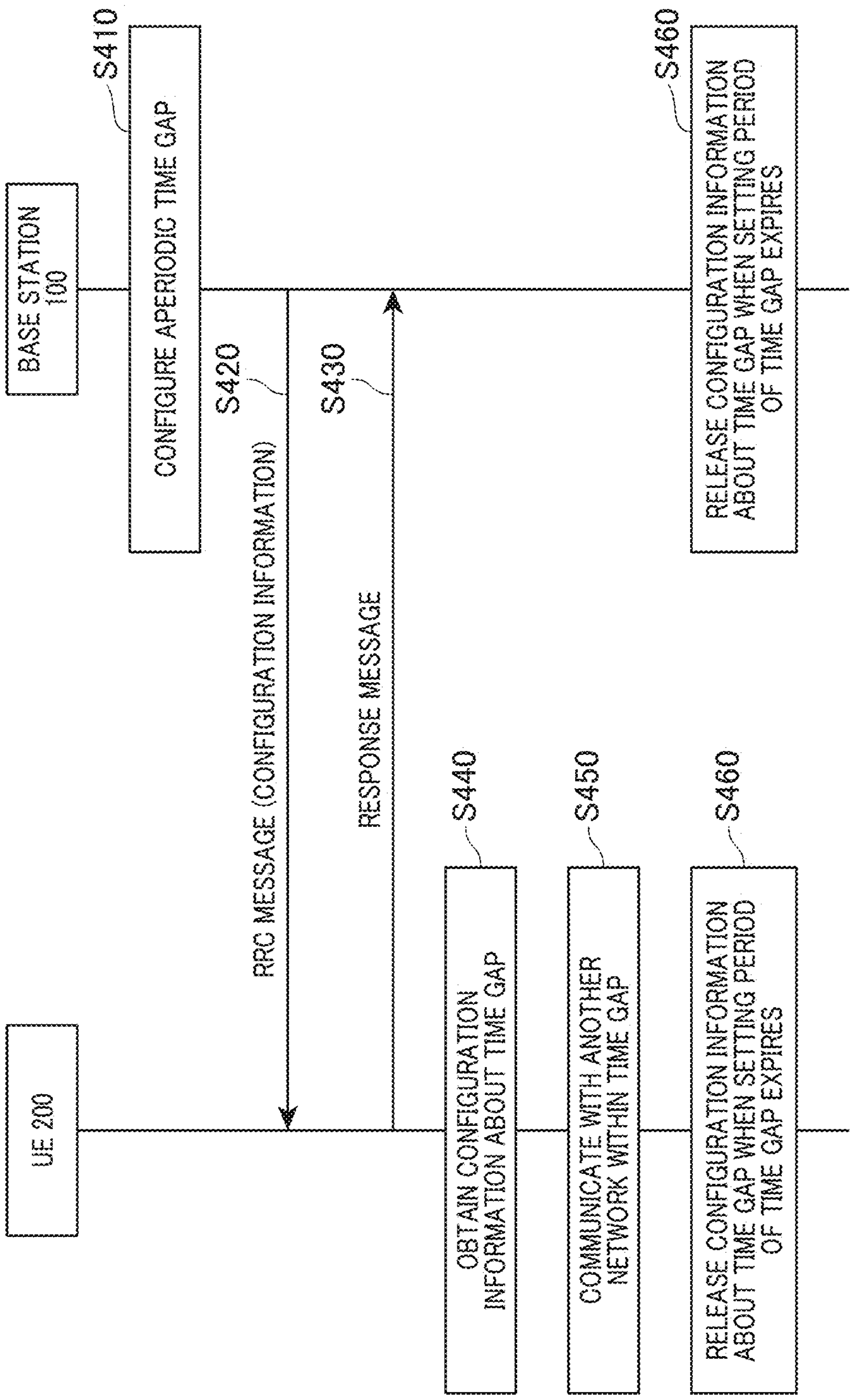
FIG. 8 is a flowchart for explaining an example of a schematic flow of processing according to embodiments of the present disclosure.

In the example of FIG. 7, network information is transmitted from the base station 300 in the second mobile network and a time gap is set in an aperiodic manner to allow the UE 200 to receive desired network information of the network information. The network information is, for example, a system information block (SIB). For example, gaps 41 to 45 that are time gaps are respectively set to allow a SIB 51 to a SIB 55 to be received. Meanwhile, it is unnecessary to receive a SIB 57 and the time gap corresponding to the SIB 57 is not thus set. In addition, no time gap is set after the gap 45. In this way, the time gap setting has an end and a time gap is set with no periodicity. That is, a time gap is aperiodic. In other words, a time gap can also be considered non-persistent or semi-persistent. Note that the transmission of a SIB other than a SIB1 is temporarily scheduled based on a master information block (MIB) and the SIB1. It thus seems appropriate to receive the other SIB by using an aperiodic time gap.

As described above, a time gap is aperiodic, causing a setting period. That is, the setting period is a parameter of the aperiodic time gap. For example, the setting period is indicated as the number of times an aperiodic time gap is set and the period information includes the number of times an aperiodic time gap is set. In the example of FIG. 7, a setting period 20 is a period in which an aperiodic time gap is set three times. The setting period 20 is a period in which the three gaps 41 to 45 are set.

The number of times an aperiodic time gap is set indicating the setting period may be the number of times a repetition period of communication associated with a time gap is repeated. For example, the number of times an aperiodic time gap is set may be a measurement gap repetition period (MGRP) in a measurement gap mechanism. In addition, for example, the number of times an aperiodic time gap is set may be the number of times the transmission periodicity of a specific SIB in the first mobile network or the second mobile network is repeated.

In addition, the number of times an aperiodic time gap is set indicating the setting period may be the number of times a period for communication associated with a time gap is repeated. For example, the number of times an aperiodic time gap is set may be the number of times an SSB measurement timing configuration (SMTC) window in the first mobile network or the second mobile network is repeated.

This makes it possible to indicate the setting period of an aperiodic time gap. In addition, counting time gaps makes it possible to determine the expiration of the setting period. It is thus possible to reduce an increasing amount of information and suppress the complication of processing.

(1-2) Transmission of RRC Message Including Configuration Information

The base station 100 (communication processing unit 145) transmits an RRC message including configuration information about an aperiodic time gap to the UE 200.

The RRC message including the configuration information may be, for example, an RRCReconfiguration message or an RRCResume message. This makes it possible to transmit the configuration information about the aperiodic time gap to the UE 200 without additionally defining a new RRC message.

In addition, the RRC message including the configuration information may be an RRC message defined for an aperiodic time gap. This makes it possible to communicate the configuration information about the aperiodic time gap without modifying an existing RRC message.

(1-3) Release of Time Gap Based on Expiration of Setting Time

The base station 100 releases configuration information about an aperiodic time gap for the UE 200. Specifically, the base station 100 (control unit 143) releases the configuration information when the setting period of the aperiodic time gap expires.

First, the base station 100 manages the configuration information for communication with the UE 200 in accordance with the state of the communication between the UE 200 and the base station 100. Specifically, the base station 100 releases the configuration information in the RRC idle state (RRC_IDLE) and maintains the configuration information in the RRC inactive state (RRC_INACTIVE) or the RRC connected state (RRC_CONNECTED).

In addition to the above, the base station 100 releases configuration information about an aperiodic time gap whose setting period expires. Specifically, when the number of time gaps reaches the number of times an aperiodic time gap is set indicated by the period information included in the configuration information, the base station 100 releases the configuration information. Referring to FIG. 7, when the third gap 45 ends, the base station 100 considers that the setting period 20 expires and releases the configuration information about the aperiodic time gap. This is because no gap is set after the expiration of the setting period 20 and the configuration information is thus unnecessary.

Different from a periodic time gap, the expiration of the setting period of an aperiodic time gap is defined and no gap is thus set after the expiration of the setting period. Therefore, while a periodic time gap that keeps on being periodically set unless configuration information is released may have an issue about decreased communication efficiency, an aperiodic time gap does not have the issue. In addition, the behaviors of the base station 100 and the UE 200 after the expiration of the setting period are not discussed.

The configuration information about the aperiodic time gap, however, keeps on being maintained, raising an issue that computational resources such as the storage capacity of a memory remain occupied. In addition, when pieces of configuration information about a plurality of time gaps are introduced as TSs, the pieces of configuration information about the time gaps that keep on being maintained may make it impossible to maintain configuration information about another time gap.

In contrast, the end of a periodic time gap and the release of the configuration information are explicitly indicated by using signaling. Meanwhile, the expiration of the setting period makes it possible to determine the end of an aperiodic time gap. Thus, when a mechanism for release in a periodic time gap is applied, only the release of the configuration information is explicitly indicated by using signaling. However, the UE 200 and the base station 100 are each capable of autonomously determine the end of an aperiodic time gap that is a condition for releasing the configuration information. Releasing the configuration information upon the expiration of the setting period as described above therefore makes it possible to release the configuration information without signaling.

(2) Operation of UE 200

The UE 200 is connected to the base station 100 in the first mobile network and receives configuration information about an aperiodic time gap for communication in the second mobile network from the base station 100. When the setting period of an aperiodic time gap expires, the UE 200 releases the configuration information about the aperiodic time gap. The following describes an operation of the UE 200 and relevant information in detail. Note that the contents which are substantially the same as the description of an operation of the base station 100 will not be described in detail.

(2-1) Reception of RRC Message Including Configuration Information

The UE 200 (communication processing unit 235) receives an RRC message including configuration information about an aperiodic time gap from the base station 100. The UE 200 (information obtaining unit 231) obtains the configuration information included in the RRC message.

Note that the UE 200 may request the base station 100 to transmit the RRC message. For example, the UE 200 may transmit a UEAssistanceInformation message or an RRCResumeRequest message. Further, the RRC message may include request information indicating that the base station 100 is requested to configure an aperiodic time gap. In addition, the UE 200 may transmit an RRC message defined for an aperiodic time gap. The defined RRC message indicates that the base station 100 is requested to configure an aperiodic time gap.

(2-2) Communication in Time Gap

The UE 200 (communication processing unit 235) communicates with the second mobile network in an aperiodic time gap. For example, the UE 200 (communication processing unit 235) receives, in an aperiodic time gap, network information transmitted from the second mobile network.

The UE 200 switches from the first mobile network to the second mobile network in the aperiodic time gap based on configuration information received from the base station 100. The UE 200 then waits for the reception of network information from the base station 300 in the second mobile network within the time gap. In other words, the UE 200 monitors for the network information. When the network information is transmitted within the time gap, the UE 200 receives the network information. The UE 200 switches from the second mobile network to the first mobile network once going out of the aperiodic time gap.

Note that no communication is performed between the base station 100 in the first mobile network and the UE 200 within the aperiodic time gap.

(2-3) Release of Time Gap Based on Expiration of Setting Time

The UE 200 releases configuration information about an aperiodic time gap. Specifically, the UE 200 (control unit 233) releases the configuration information when the setting period of the aperiodic time gap expires.

The UE 200 manages the configuration information for communication with the base station 100 in accordance with the state of the communication between the UE 200 and the base station 100 as with the base station 100. In addition, the UE 200 releases configuration information about an aperiodic time gap whose setting period expires. Specifically, when the number of time gaps reaches the number of times an aperiodic time gap is set indicated by the period information included in the configuration information, the UE 200 releases the configuration information. In this way, the UE 200 autonomously releases the configuration information about the aperiodic time gap without explicit release indication from the base station 100.

(3) Flow of Processing

An example of processing according to embodiments of the present disclosure will be described with reference to FIG. 8. In FIG. 8, the base station 100 in the first mobile network and the UE 200 are in the connected state.

The base station 100 configures an aperiodic time gap (S410). For example, the base station 100 generates configuration information about an aperiodic time gap including period information indicating a setting period.

The base station 100 transmits an RRC message including the configuration information about the aperiodic time gap to the UE 200 (S420). For example, the RRC message is an RRCReconfiguration message or an RRCResume message. Note that the RRC message may include other configuration information.

When the UE 200 receives the RRC message including the configuration information about the aperiodic time gap, the UE 200 transmits a response RRC message serving as a response to the RRC message to the base station 100 (S430). For example, the response RRC message is an RRCReconfigurationComplete message or an RRCResumeComplete message.

The UE 200 obtains configuration information about an aperiodic time gap (S440). For example, the UE 200 obtains the configuration information about the aperiodic time gap included in the received RRC message.

The UE 200 communicates with another network within the aperiodic time gap (S450). For example, the UE 200 switches to the second mobile network within the aperiodic time gap based on the obtained configuration information and waits for the reception of network information to be transmitted from the base station 300 in the second mobile network.

When the setting period of an aperiodic time gap expires, the base station 100 and the UE 200 release the configuration information about the time gap (S460). For example, when the number of time gaps reaches the number of times an aperiodic time gap is set, the base station 100 and the UE 200 each release the configuration information about the aperiodic time gap.

In this way, according to embodiments of the present disclosure, the UE 200 and the base station 100 in the first mobile network that are in the RRC connected state communicate an RRC message including configuration information about an aperiodic time gap for communication in the second mobile network, the configuration information includes period information associated with a setting period in which the aperiodic time gap is set, and the configuration information is released when the setting period expires. This allows the base station 100 and the UE 200 to each release the configuration information autonomously based on the configuration information about the aperiodic time gap. That is, it is possible to release the configuration information without signaling. It is thus possible to reduce the consumption of power or radio resources while releasing configuration information about an aperiodic time gap

5. MODIFICATION EXAMPLES

Figure 9:
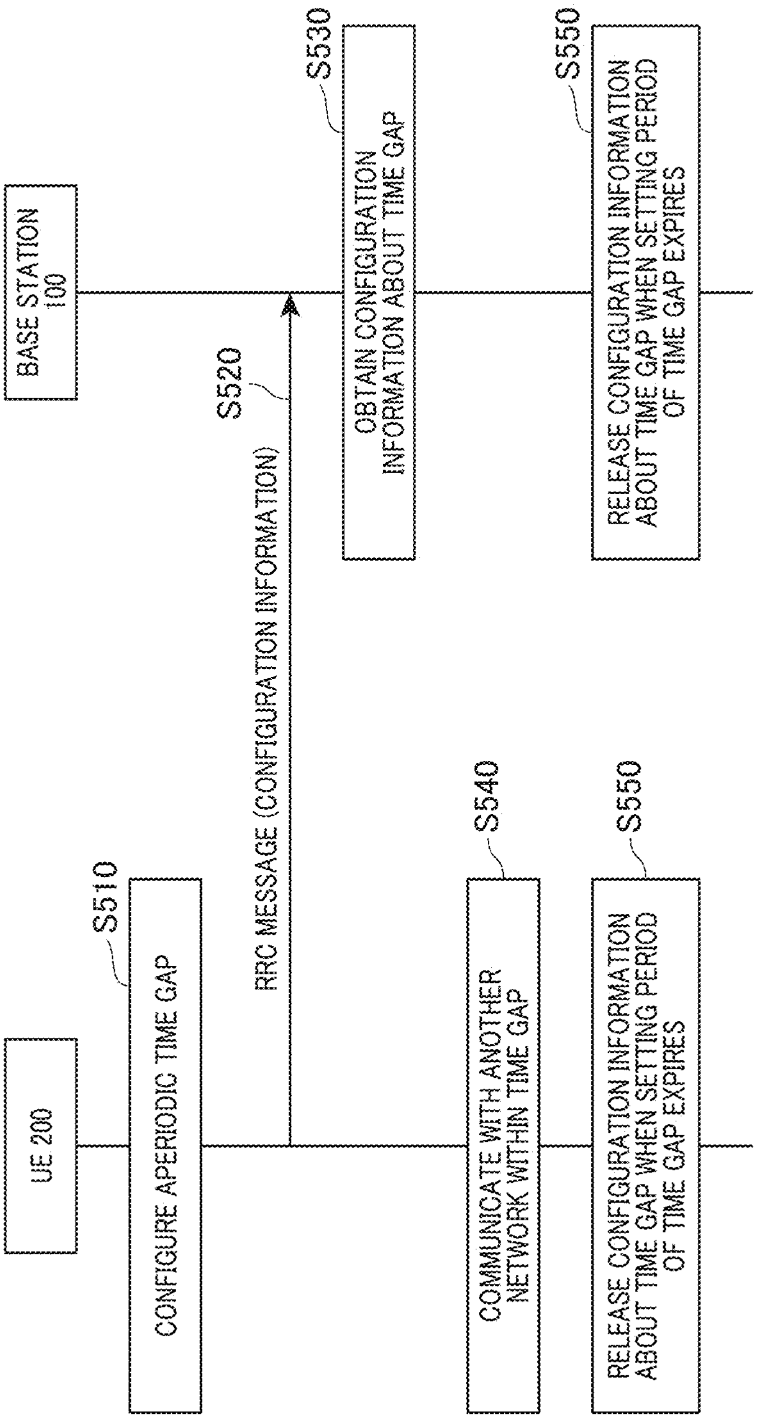
FIG. 9 is a flowchart for explaining an example of a schematic flow of processing according to a second modification example of embodiments of the present disclosure.

First to fourth modification examples according to embodiments of the present disclosure will be described with reference to FIGS. 7, 9, and 10. Note that two or more of these modification examples may be combined.

(1) First Modification Example

Another Example of Information Indicating Setting Period

In the embodiments of the present disclosure described above, the setting period of an aperiodic time gap is indicated as the number of times an aperiodic time gap is set and the expiration of the setting period includes the number of aperiodic time gaps reaching the number of times an aperiodic time gap is set. However, the information indicating the setting period according to embodiments of the present disclosure is not limited to this example.

As the first modification example of embodiments of the present disclosure, the setting period may be indicated as setting time for which an aperiodic time gap is set and the expiration of the setting period may include the expiration of the setting time. More specifically, the information indicating the setting time may include the length of the setting time, the start time point and the end time point of the setting time, or the start time point or the end time point of the setting time and the length of the setting time. The period information includes the information indicating the setting time.

Referring to FIG. 7, the setting period 20 is indicated, for example, as length 31 of the setting time. In addition, the setting period 20 may be indicated, for example, as a start time point 33 and an end time point 35 of the setting time. In addition, the setting period 20 may be indicated as the start time point 33 or the end time point 35 of the setting time and the length 31 of the setting time.

The length of the setting time indicating the setting period may be a numerical value that is a specific unit such as a second or a millisecond.

In addition, the length of the setting time indicating the setting period may be the product of the number of times an aperiodic time gap is set and a period for the number of times an aperiodic time gap is set in the embodiments described above. For example, the length of the setting time may be indicated as the number of times an aperiodic time gap is set×MGRP, the number of times an aperiodic time gap is set×the transmission periodicity of a specific SIB, the number of times an aperiodic time gap is set×SMTC, or the like.

In this way, the setting period is indicated as the time length or the time points. This makes it possible to directly control the setting period on time. It is therefore possible to more accurately control a time gap on time as compared with a case where the setting period is indicated as the number of times an aperiodic time gap is set.

In addition, as another modification example, the setting period may be indicated as a setting pattern of an aperiodic time gap and the expiration of the setting period may include a pattern of an aperiodic time gap matching the setting pattern. The period information includes the setting pattern. For example, the setting pattern may be a setting interval between time gaps. This makes it possible to indicate the setting period of a time gap without the number of times an aperiodic time gap is set and the setting time.

(2) Second Modification Example

Configuration of Time Gap by UE

In the embodiments of the present disclosure described above, the base station 100 configures an aperiodic time gap and transmits configuration information about the aperiodic time gap to the UE 200. However, the subject that configures the time gap according to embodiments of the present disclosure is not limited to this example.

As the second modification example of embodiments of the present disclosure, the UE 200 may transmit configuration information about an aperiodic time gap to the base station 100. More specifically, the UE 200 (control unit 233) obtains the configuration information about the aperiodic time gap. The UE 200 (communication processing unit 235) then transmits an RRC message including the configuration information about an aperiodic time gap to the base station 100.

An example of processing according to the present modification example will be described with reference to FIG. 9. In FIG. 9, the base station 100 in the first mobile network and the UE 200 are in the connected state.

The UE 200 configures an aperiodic time gap (S510). For example, the UE 200 generates configuration information about an aperiodic time gap including period information indicating a setting period.

The UE 200 transmits an RRC message including the configuration information about the aperiodic time gap to the base station 100 (S520). For example, the RRC message is a UEAssistanceInformation message or an RRCResumeComplete message. This makes it possible to transmit the configuration information about the aperiodic time gap to the base station 100 without additionally defining a new RRC message.

The base station 100 obtains configuration information about an aperiodic time gap (S530). For example, the base station 100 obtains the configuration information about the aperiodic time gap included in the received RRC message.

The UE 200 communicates with another network within the aperiodic time gap (S540). For example, the UE 200 switches to the second mobile network within the aperiodic time gap configured in the UE 200 and waits for the reception of network information to be transmitted from the base station 300 in the second mobile network.

When the setting period of an aperiodic time gap expires, the base station 100 and the UE 200 each release the configuration information about the time gap (S550).

Note that it has been described above that the UE 200 configures an aperiodic time gap and transmits configuration information about the aperiodic time gap to the base station 100. The UE 200 may, however, decide an aperiodic time gap and transmit information (for example, period information or the like) for identifying the decided aperiodic time gap to the base station 100.

(3) Third Modification Example

Notification of Release in Existing RRC Message

In the embodiments of the present disclosure described above, no signaling is performed for the release of configuration information about an aperiodic time gap. However, processing for releasing configuration information about an aperiodic time gap according to embodiments of the present disclosure is not limited to this example.

As the third modification example of embodiments of the present disclosure, the UE 200 (communication processing unit 235) may receive or transmit another RRC message that is transmitted without being triggered by the expiration of the setting period of an aperiodic time gap. The other RRC message includes information associated with the release of configuration information about an aperiodic time gap.

More specifically, the information associated with the release of configuration information about an aperiodic time gap may indicate a report of the release. For example, when the setting period of an aperiodic time gap expires, the base station 100 and the UE 200 each release the configuration information about the aperiodic time gap. After that, when transmitting an RRC message for another purpose, at least one of the base station 100 or the UE 200 includes information indicating the report of the release in the RRC message. The RRC message is an existing RRC message.

An example of processing according to the present modification example will be described with reference to FIG. 10. In FIG. 10, the base station 100 in the first mobile network and the UE 200 are in the connected state.

When the setting period of an aperiodic time gap expires, the base station 100 and the UE 200 each release the configuration information about the aperiodic time gap (S610).

The base station 100 transmits an RRC message to the UE 200 for another purpose (S620). For example, the base station 100 transmits an RRC message for another purpose irrespective of an aperiodic time gap. Note that the RRC message for the other purpose is an existing RRC message which requests a response. For example, the existing RRC message that requests a response is an RRCReconfiguration or RRCResume message.

When the UE 200 receives the RRC message for the other purpose, the UE 200 transmits an RRC message including information associated with the release of configuration information about an aperiodic time gap to the base station 100 (S630). For example, the UE 200 transmits a response RRC message that is an RRC message serving as a response to the received RRC message for the other purpose and including information indicating a report of the release of the configuration information about the aperiodic time gap. For example, the response RRC message is an RRCReconfigurationComplete message or an RRCResumeComplete message.

Figure 10:
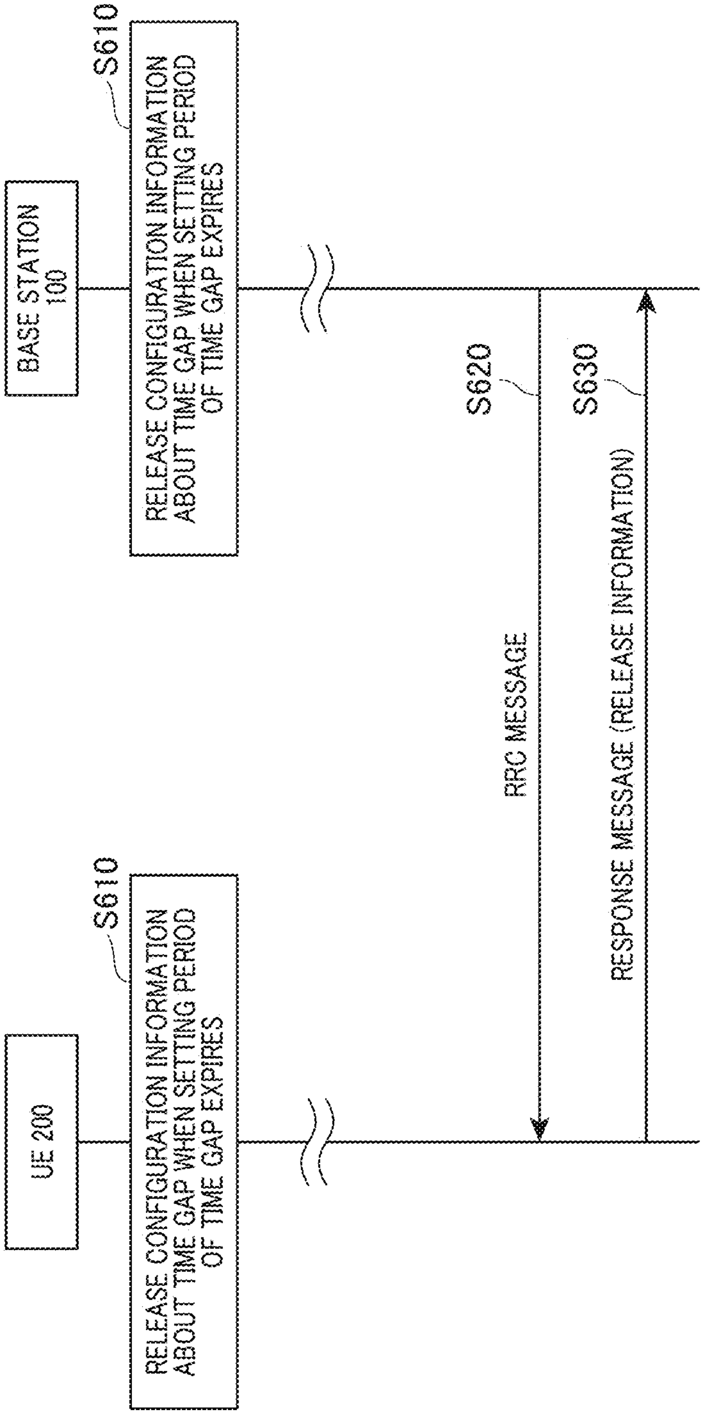
FIG. 10 is a flowchart for explaining an example of a schematic flow of processing according to a third modification example of embodiments of the present disclosure.

Note that a second RRC message serving as a response to a first RRC message transmitted from the base station 100 to the UE 200 includes the information associated with the release in the example of FIG. 10, but the first RRC message may include the information associated with the release. In addition, an RRC message spontaneously transmitted by the UE 200 to the base station 100 may include the information associated with the release.

In addition, the information associated with the release may be information for requesting the release. Specifically, the base station 100 or the UE 200 may release the configuration information about the aperiodic time gap upon receiving another RRC message including the information for requesting the release. For example, in a case where the base station 100 transmits the other RRC message including the information for requesting the release, the UE 200 may release the configuration information about the aperiodic time gap upon receiving the other RRC message. In addition, in a case where the UE 200 transmits the other RRC message including the information for requesting the release, the base station 100 may release the configuration information about the aperiodic time gap upon receiving the other RRC message.

In this way, a notification of the release of an aperiodic time gap is issued by using an existing RRC message, making it possible to synchronize the configuration information about the aperiodic time gap without consuming power and radio resources only for the release.

(4) Fourth Modification Example

Compliance with Other TSs

In the example described in embodiments of the present disclosure, the system 1 is a system compliant with the TSs of 5G or NR. However, the system 1 according to embodiments of the present disclosure is not limited to this example.

In the fourth modification example of embodiments of the present disclosure, the system 1 may be a system compliant with other TSs in 3GPP. As an example, the system 1 may be a system compliant with the TSs of long term evolution (LTE), LTE advanced (LTE-A), or 4G and the base station 100 may be an evolved node B (eNB). Alternatively, the base station 100 may be an ng-eNB. As another example, the system 1 may be a system compliant with the TSs of 3G and the base station 100 may be a Node B. As yet another example, the system 1 may be a system compliant with next generation (for example, 6G) TSs.

Alternatively, the system 1 may be a system compliant with TSs of another standards organization for mobile communications.

While embodiments of the present disclosure have been described above, the present disclosure is not limited to the embodiments. It will be understood by those skilled in the art that the embodiments are merely examples and various changes can be made without departing from the scope and the spirit of the present disclosure.

For example, steps in a process described in the present specification do not necessarily have to be executed chronologically in the order described in the flowchart or the sequence diagram. For example, steps in a process may be executed in an order different from the order described as the flowchart or the sequence diagram or may be executed in parallel. In addition, some of steps in a process may be removed or a further step may be added to the process.

For example, there may be provided a method including the operations of one or more components of the apparatus described in the present specification or there may be provided a program for causing a computer to execute the operations of the components. Moreover, there may be provided a non-transitory tangible computer-readable storage medium having stored therein the program. Naturally, such a method, program, and non-transitory tangible computer-readable storage medium are also included in the present disclosure.

For example, in the present disclosure, a user equipment (UE) may be referred to by another name such as mobile station, mobile terminal, mobile apparatus, mobile unit, subscriber station, subscriber terminal, subscriber apparatus, subscriber unit, wireless station, wireless terminal, wireless apparatus, wireless unit, remote station, remote terminal, remote apparatus, or remote unit.

For example, in the present disclosure, "transmit" may mean performing processing of at least one layer in a protocol stack used for transmission or physically transmitting a signal wirelessly or by wire. Alternatively, "transmit" may mean a combination of performing the processing of the at least one layer and physically transmitting a signal wirelessly or by wire. Similarly, "receive" may mean performing processing of at least one layer in a protocol stack used for reception or physically receiving a signal wirelessly or by wire. Alternatively, "receive" may mean a combination of performing the processing of the at least one layer and physically receiving a signal wirelessly or by wire. The at least one layer may be replaced with at least one protocol.

For example, in the present disclosure, "obtain/acquire" may mean obtaining/acquiring information from stored information, obtaining/acquiring information from information received from another node, or obtaining/acquiring information by generating the information.

For example, in the present disclosure, "include" and "comprise" do not mean that listed items alone are included, but mean that listed items alone may be included or a further item may be included in addition to the listed items.

For example, in the present disclosure, "or" does not mean exclusive OR, but means inclusive OR.

Note that the technical features included in the embodiments may be represented as the following features. Naturally, the present disclosure is not limited to the following features.

(Feature 1)

A user equipment (200) comprising:

a communication processing unit (235) configured to communicate with a base station (100) in a first mobile network; and an information obtaining unit (231) configured to obtain configuration information about an aperiodic time gap for communication in a second mobile network, wherein the communication processing unit is configured to receive a radio resource control (RRC) message including the configuration information from the base station or transmit an RRC message including the configuration information to the base station, the aperiodic time gap is a time gap in which the user equipment and the base station are in an RRC connected state, and the configuration information includes period information associated with a setting period (20) in which the aperiodic time gap is set and is released when the setting period expires.

(Feature 2)

The user equipment according to Feature 1, wherein the setting period is indicated as a number of times the aperiodic time gap is set, the period information includes the number of times the aperiodic time gap is set, and expiration of the setting period includes a number of the aperiodic time gaps reaching the number of times the aperiodic time gap is set.

(Feature 3)

The user equipment according to Feature 1 or 2, wherein the setting period is indicated as setting time for which the aperiodic time gap is set, the period information includes information indicating the setting time, and expiration of the setting period includes expiration of the setting time.

(Feature 4)

The user equipment according to Feature 3, wherein the information indicating the setting time includes length (31) of the setting time, a start time point (33) and an end time point (35) of the setting time, or the start time point or the end time point of the setting time and the length of the setting time.

(Feature 5)

The user equipment according to any one of Features 1 to 4, wherein the RRC message is an RRC message defined for the aperiodic time gap.

(Feature 6)

The user equipment according to any one of Features 1 to 5, wherein the communication processing unit is configured to receive or transmit another RRC message that is transmitted without being triggered by expiration of the setting period, and the other RRC message includes information associated with release of the configuration information.

(Feature 7)

The user equipment according to any one of Features 1 to 6, wherein the communication processing unit is configured to receive an RRCReconfiguration message or an RRCResume message including the configuration information from the base station or transmit a UEAssistanceInformation message or an RRCResumeComplete message including the configuration information to the base station.

(Feature 8)

The user equipment according to any one of Features 1 to 7, wherein the communication in the second mobile network includes transmission of network information in the second mobile network.

(Feature 9)

The user equipment according to Feature 8, wherein the network information includes a system information block (SIB).

(Feature 10)

A base station (100) in a first mobile network, comprising:

a communication processing unit (145) configured to communicate with a user equipment (200); and an information obtaining unit (141) configured to obtain configuration information about an aperiodic time gap for communication in a second mobile network, wherein the communication processing unit is configured to receive a radio resource control (RRC) message including the configuration information from the user equipment or transmit an RRC message including the configuration information to the user equipment, the aperiodic time gap is a time gap in which the user equipment and the base station are in an RRC connected state, and the configuration information includes period information associated with a setting period (20) in which the aperiodic time gap is set and is released when the setting period expires.

(Feature 11)

A method performed by a user equipment (200), comprising:

communicating with a base station (100) in a first mobile network;

obtaining configuration information about an aperiodic time gap for communication in a second mobile network; and receiving an RRC message including the configuration information from the base station or transmitting an RRC message including the configuration information to the base station, wherein the aperiodic time gap is a time gap in which the user equipment and the base station are in an RRC connected state, and the configuration information includes period information associated with a setting period (20) in which the aperiodic time gap is set and is released when the setting period expires.

(Feature 12)

A method performed by a base station (100) in a first mobile network, comprising:

communicating with a user equipment (200);

obtaining configuration information about an aperiodic time gap for communication in a second mobile network; and receiving an RRC message including the configuration information from the user equipment or transmitting an RRC message including the configuration information to the user equipment, wherein the aperiodic time gap is a time gap in which the user equipment and the base station are in an RRC connected state, and the configuration information includes period information associated with a setting period (20) in which the aperiodic time gap is set and is released when the setting period expires.

(Feature 13)

A program for causing a computer to execute operations of:

communicating with a base station (100) in a first mobile network;

obtaining configuration information about an aperiodic time gap for communication in a second mobile network; and receiving an RRC message including the configuration information from the base station or transmitting an RRC message including the configuration information to the base station, wherein the aperiodic time gap is a time gap in which a user equipment (200) and the base station are in an RRC connected state, and the configuration information includes period information associated with a setting period (20) in which the aperiodic time gap is set and is released when the setting period expires.

(Feature 14)

A program for causing a computer to execute operations of:

communicating with a user equipment (200) in a first mobile network;

obtaining configuration information about an aperiodic time gap for communication in a second mobile network; and receiving an RRC message including the configuration information from the user equipment or transmitting an RRC message including the configuration information to the user equipment, wherein the aperiodic time gap is a time gap in which the user equipment and a base station (100) in the first mobile network are in an RRC connected state, and the configuration information includes period information associated with a setting period (20) in which the aperiodic time gap is set and is released when the setting period expires.

(Feature 15)

A non-transitory tangible computer-readable storage medium having stored therein a program for causing a computer to execute operations of:

communicating with a base station (100) in a first mobile network;

obtaining configuration information about an aperiodic time gap for communication in a second mobile network; and receiving an RRC message including the configuration information from the base station or transmitting an RRC message including the configuration information to the base station, wherein the aperiodic time gap is a time gap in which a user equipment (200) and the base station are in an RRC connected state, and the configuration information includes period information associated with a setting period (20) in which the aperiodic time gap is set and is released when the setting period expires.

(Feature 16)

A non-transitory tangible computer-readable storage medium having stored therein a program for causing a computer to execute operations of:

communicating with a user equipment (200) in a first mobile network;

obtaining configuration information about an aperiodic time gap for communication in a second mobile network; and receiving an RRC message including the configuration information from the user equipment or transmitting an RRC message including the configuration information to the user equipment, wherein the aperiodic time gap is a time gap in which the user equipment and a base station (100) in the first mobile network are in an RRC connected state, and the configuration information includes period information associated with a setting period (20) in which the aperiodic time gap is set and is released when the setting period expires.

What is claimed is:

1. An apparatus comprising:

a memory storing a program; and one or more processors configured to execute the program to:

process communication with a first network and a second network;

receive, from a base station apparatus in the first network, a radio resource control (RRC) message including first information for indicating a starting position of an aperiodic gap and second information for indicating a length of the aperiodic gap in a case where the apparatus is in RRC connected state in the first network;

determine the aperiodic gap based on the first information for indicating the starting position of the aperiodic gap and the second information for indicating the length of the aperiodic gap;

perform a switching for the communication with the second network within the aperiodic gap;

receive, from the base station apparatus in the first network, the RRC message including fourth information for configuring a periodic gap;

receive, from the base station apparatus in the first network, the RRC message including fifth information for indicating release of the periodic gap;

perform a switching for the communication with the second network within the periodic gap based on the fourth information for configuring the periodic gap; and release the fourth information for configuring the periodic gap based on receiving the fifth information for indicating the release of the periodic gap;

wherein the first information for indicating the starting position of the aperiodic gap and the second information for indicating the length of the aperiodic gap are not maintained for the aperiodic gap.

2. The apparatus according to claim 1, wherein the one or more processors are further configured to execute the program to transmit, to the base station apparatus in the first network, a UEAssistanceInformation message including third information for indicating the starting position of the aperiodic gap, and the aperiodic gap is determined based on the third information for indicating the starting position of the aperiodic gap included in the UEAssistanceInformation message.

3. The apparatus according to claim 1, wherein the first information for indicating the starting position of the aperiodic gap and the second information for indicating the length of the aperiodic gap are released without receiving any information for indicating the release of the aperiodic gap.

4. The apparatus according to claim 1, wherein the first information for indicating the starting position of the aperiodic gap and the second information for indicating the length of the aperiodic gap are not stored for the aperiodic gap.

5. A base station apparatus in a first network, the base station apparatus comprising:

a memory storing a program; and one or more processors configured to execute the program to:

process communication with an apparatus;

transmit, to the apparatus, a radio resource control (RRC) message including first information for indicating a starting position of an aperiodic gap and second information for indicating length of the aperiodic gap in a case where the apparatus is in RRC connected state in the first network;

transmit, to the apparatus, the RRC message including fourth information for configuring a periodic gap; and transmit, to the apparatus, the RRC message including fifth information for indicating release of the periodic gap;

wherein:

the aperiodic gap is determined based on the first information for indicating the starting position of the aperiodic gap and the second information for indicating the length of the aperiodic gap, a switching for communication with a second network is performed within the aperiodic gap, a switching for the communication with the second network is performed within the periodic gap based on the fourth information for configuring the periodic gap, the fourth information for configuring the periodic gap is released based on transmitting the fifth information for indicating the release of the periodic gap, and the first information for indicating the starting position of the aperiodic gap and the second information for indicating the length of the aperiodic gap are not maintained for the aperiodic gap.

6. The base station apparatus according to claim 5, wherein the one or more processors are further configured to execute the program to receive, from the apparatus, a UEAssistanceInformation message including third information for indicating the starting position of the aperiodic gap, the aperiodic gap is determined based on the third information for indicating the starting position of the aperiodic gap included in the UEAssistanceInformation message.

7. The base station apparatus according to claim 5, wherein the first information for indicating the starting position of the aperiodic gap and the second information for indicating the length of the aperiodic gap are released without receiving any information for indicating the release of the aperiodic gap.

8. The base station apparatus according to claim 5, wherein the first information for indicating the starting position of the aperiodic gap and the second information for indicating the length of the aperiodic gap are not stored for the aperiodic gap.

9. A method performed by an apparatus, the method comprising:

processing communication with a first network and a second network;

receiving, from a base station apparatus in the first network, a radio resource control (RRC) message including first information for indicating a starting position of an aperiodic gap and second information for indicating length of the aperiodic gap in a case where the apparatus is in RRC connected state in the first network;

determining the aperiodic gap based on the first information for indicating the starting position of the aperiodic gap and the second information for indicating the length of the aperiodic gap;

performing a switching for the communication with the second network within the aperiodic gap;

receiving, from the base station apparatus in the first network, the RRC message including fourth information for configuring a periodic gap;

receiving, from the base station apparatus in the first network, the RRC message including fifth information for indicating release of the periodic gap;

performing a switching for the communication with the second network within the periodic gap based on the fourth information for configuring the periodic gap; and releasing the fourth information for configuring the periodic gap based on receiving the fifth information for indicating the release of the periodic gap;

wherein the first information for indicating the starting position of the aperiodic gap and the second information for indicating the length of the aperiodic gap are not maintained for the aperiodic gap.

10. The method according to claim 9, further comprising transmitting, to the base station apparatus in the first network, a UEAssistanceInformation message including third information for indicating the starting position of the aperiodic gap, wherein the aperiodic gap is determined based on the third information for indicating the starting position of the aperiodic gap included in the UEAssistanceInformation message.

11. The method according to claim 9, wherein the first information for indicating the starting position of the aperiodic gap and the second information for indicating the length of the aperiodic gap are released without receiving any information for indicating the release of the aperiodic gap.

12. The method according to claim 9, wherein the first information for indicating the starting position of the aperiodic gap and the second information for indicating the length of the aperiodic gap are not stored for the aperiodic gap.

* * * * *